(12) United States Patent
Piontek et al.

(10) Patent No.: US 12,134,109 B2
(45) Date of Patent: Nov. 5, 2024

(54) SYSTEM AND METHOD FOR TRANSFERRING AND/OR SORTING PIECE GOODS INTO REMOVAL REGIONS

(71) Applicant: Deutsche Post AG, Bonn (DE)

(72) Inventors: Christoph Piontek, Morsbach (DE); Ralf Lindenpütz, Altenkirchen (DE); Dirk Westerholt, Bonn (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 18/322,694

(22) Filed: May 24, 2023

(65) Prior Publication Data

US 2023/0381821 A1 Nov. 30, 2023

(30) Foreign Application Priority Data

May 25, 2022 (DE) ...................... 10 2022 113 319.2

(51) Int. Cl.
*B07C 3/00* (2006.01)
*B07C 3/08* (2006.01)
*B65G 17/26* (2006.01)

(52) U.S. Cl.
CPC ................ *B07C 3/008* (2013.01); *B07C 3/08* (2013.01); *B65G 17/26* (2013.01)

(58) Field of Classification Search
CPC ........... B07C 3/08; B07C 3/008; B65G 47/22; B65G 47/42; B65G 47/48; B65G 47/53; B65G 2201/407; B65G 17/26
USPC ....................................................... 209/707
See application file for complete search history.

(56) References Cited

U.S. PATENT DOCUMENTS

| 3,049,218 | A | 8/1962 | Bishop |
| 6,292,710 | B1 | 9/2001 | Bonnet |
| 9,364,865 | B2 * | 6/2016 | Kim .......................... B07C 3/02 |
| 2015/0217334 | A1 | 8/2015 | Kim |

FOREIGN PATENT DOCUMENTS

DE 101 36 124 C1 2/2003
WO WO2018/231349 A 12/2018

OTHER PUBLICATIONS

Office Action received in corresponding Application No. DE 10 2022 113 319.2, dated Feb. 9, 2023, 16 pages.
Extended European Search Report (w/ English translation) for corresponding Application No. EP23175190.0, search completed Sep. 21, 2023, 14 pages.

* cited by examiner

*Primary Examiner* — Michael McCullough
*Assistant Examiner* — Jessica L Burkman
(74) *Attorney, Agent, or Firm* — Dority & Manning, P.A.

(57) ABSTRACT

A system for transferring and/or sorting piece goods into removal regions includes a conveying device with a transport surface, movable in a transport direction, for piece goods, and a multiplicity of receiving devices for moving the piece goods from the transport surface of the conveying device into the respective removal region. The conveying device is configured as a horizontal circuit, and has at least two sections which lie opposite one another. A first group of receiving devices points from the first of the two sections into an interior of the circuit, and a second group of receiving devices points from the second of the two sections into the interior of the circuit. At least one receiving device of the first group is arranged in the interior of the circuit laterally directly next to a receiving device of the second group.

16 Claims, 3 Drawing Sheets

SYSTEM AND METHOD FOR TRANSFERRING AND/OR SORTING PIECE GOODS INTO REMOVAL REGIONS

CROSS-REFERENCE TO RELATED APPLICATIONS

The present application is based upon and claims the right of priority to German Patent Application Number 10 2022 113 319.2, filed May 25, 2022, the disclosure of which is hereby incorporated by reference herein in its entirety for all purposes.

TECHNICAL FIELD

The invention relates to a system for transferring and/or sorting piece goods into removal regions.

In addition, the invention relates to a method for transferring and/or sorting piece goods into removal regions.

BACKGROUND OF THE INVENTION

As a consequence of increasing freight transport by piece goods shipping, truck or container transport, sea and/or air freight parcel transport within the context of e-commerce and online mail order ranges, the number of transported goods and, in particular, parcel consignments (generally called piece goods in the following text) have increased significantly.

The courier, express and parcel services are therefore an important constituent part of the transport business, and are distinguished by speed, punctuality and reliability. The providers collect, sort and organize piece good movements between their distribution centers which are also called delivery points and/or hubs. During transport, standardized interchangeable containers with fixed walls and roller doors on one end side are used almost throughout, in which exchangeable containers the piece goods, for example packaged goods, small consignments such as, for example, small parcels and/or packages, are conveyed in roller boxes and/or on pallets. In order to transport the piece goods from the sender to the recipient as efficiently as possible, as many of the process steps as possible in the hubs and/or delivery points are additionally processed in an automated manner as far as possible.

The hubs and/or delivery points form a finely structured sorting and distribution network of substantially hierarchical construction: the piece goods which are delivered by customers in branches or delivery stations and/or the piece goods which are collected directly from the customer are conveyed to a corresponding starting distribution center (also called a dispatch hub). The sorting and the forwarding to the target distribution center corresponding to the consignment (also called an inbound hub) takes place on the basis of a barcode, via automatic address reading and/or video encoding. The conveying takes place between the distribution centers, for example, in direct traffic via exchangeable container. The piece goods are once again sorted in the destination distribution center in accordance with their associated routing information, and are subsequently forwarded to the regional delivery points within the context of detailed distribution using supply trips. From the regional delivery point, the delivery agent then assumes the further transport of the consignment to the recipient or else to a collection point selected by the recipient. Depending on the utilization rate and operating efficiency, it can also be provided that the starting distribution center sends piece goods directly to a regional delivery point outside its region, and the destination distribution center is therefore relieved of piece good quantities. In addition, the flexibility of the distribution network is increased in this way. By virtue of the fact that the regional delivery points sort the piece goods of their supply region themselves, they additionally relieve the destination distribution center of the detailed sorting.

During the delivery from the regional delivery points to the recipient, a distinction is additionally made for economic and capacity reasons between standard districts and combination districts. In standard districts, a standard delivery takes place, in the case of which piece goods, for example parcel consignments and small packages, are delivered separately from letters. In combination districts, in contrast, a combination delivery takes place, in the case of which the piece goods and letters are delivered jointly. Whether a district is a standard district or a combination district is dependent, inter alia, on the parcel and letter volume in the district, and can also change over time.

The distinction of standard districts and combination districts, and therefore the classification of the piece goods into two categories leads in the regional delivery points which carry out the detailed sorting of the piece goods to it being necessary for a check to be carried out during the sorting in each case as to whether there are combination or standard districts in the vicinity of the regional delivery point. This makes the sorting processes in the regional delivery points complex, and additionally leads to it being necessary for the sorting processes in the regional delivery points to be adapted in each case depending on their letter and piece good volume. In addition, there is a requirement to increase the capacities on account of the increasing piece good volume.

DESCRIPTION OF THE INVENTION

Proceeding from this situation, it is an object of the present invention to specify a system and a corresponding method to increase the efficiency during transferring and/or sorting piece goods. In addition, it is an object of the present invention to specify a system and a corresponding method to enable a flexible utilization of a delivery point, in the case of which different letter and piece good volumes can be reacted to rapidly and simply.

The object of the invention is achieved by the features of the independent claims. Advantageous refinements are specified in the subclaims.

Accordingly, the object is achieved by a system for transferring and/or sorting piece goods into removal regions, the system comprising a conveying device with a transport surface, movable in a transport direction, for piece goods, and a multiplicity of receiving devices for moving the piece goods from the transport surface of the conveying device into the respective removal region, the conveying device being configured as a horizontal circuit, and having at least two sections which lie opposite one another, a first group of receiving devices pointing from the first of the two sections into an interior of the circuit, a second group of receiving devices pointing from the second of the two sections into the interior of the circuit, and at least one receiving device of the first group being arranged in the interior of the circuit laterally directly next to a receiving device of the second group.

The object is additionally achieved by a method for transferring and/or sorting piece goods into removal regions by way of a system comprising a conveying device with a transport surface, movable in a transport direction, for piece goods, and a multiplicity of receiving devices for moving the piece goods from the transport surface of the conveying device into the respective removal region, the conveying device being configured as a horizontal circuit, and having at least two sections which lie opposite one another, a first group of receiving devices pointing from the first of the two sections into an interior of the circuit, a second group of receiving devices pointing from the second of the two sections into the interior of the circuit, and at least one receiving device of the first group being arranged in the interior of the circuit laterally directly next to a receiving device of the second group, with the step:

sorting of the piece goods in such a way that combination district piece goods are moved by way of receiving devices of the first group to the respective removal regions, and that standard district piece goods are moved by way of receiving devices of the second group to the respective removal regions.

One aspect of the invention lies in the fact that the receiving devices point to the interior of the circuit, emanate from two sections of the circuit which lie opposite one another, and at least one receiving device of the first group is arranged in the interior of the circuit laterally directly next to a receiving device of the second group. The arrangement of the receiving devices allows the piece goods which are delivered in a combination district (what are known as combination district piece goods, that is to say preferably piece goods which are delivered together with letters) to be moved during sorting by way of receiving devices of the first group to the respective removal regions, and piece goods which are delivered in a standard district (what are known as standard district piece goods, that is to say preferably piece goods which are delivered exclusively with other piece goods) to be moved by way of receiving devices of the second group to the respective removal regions. In particular, the arrangement allows a brief delivery type adaptation without it being necessary in the process for the arrangement of the receiving devices with respect to one another to be changed, with the result that the flexibility is increased. Therefore, a flexible reaction can be carried out by means of the system and the method to the changing quantities of piece goods of different categories which, within the context of this application, are called combination district piece goods and standard district piece goods. It is not exclusively possible, however, for the method to be carried out with combination district piece goods and standard district piece goods, but rather an efficient removal in the removal regions is generally made possible in the case of piece goods which belong to two different categories.

In other words, a spatial separation of the corresponding removal regions takes place by way of the arrangement of the receiving devices in so far as the removal regions are situated on two opposite sides. Correspondingly, removal regions on the one side can be used for combination district piece goods, and removal regions on the other side can be used for standard district piece goods. On account of the spatial separation, a flexible switch of the sorting processes can take place without it being necessary for the arrangement of the receiving devices to be changed during the switch. Since, during sorting, the combination district piece goods are conveyed into the removal regions of the combination side, and standard district piece goods are conveyed into the removal regions of the standard side, a separation of the combination and standard district piece goods is ensured, with the result that the necessity of considering in advance whether combination or standard districts lie in the vicinity of the regional delivery point is dispensed with completely.

In addition, the arrangement of the receiving devices leads to the removal regions being situated on two opposite sides, with the result that the downstream loading of delivery vehicles with the piece goods can also be carried out on two opposite sides. Therefore, in comparison with an arrangement in which the receiving devices all point in one direction, there is more space provided for the delivery vehicles or up to twice as many delivery vehicles can be used in the case of an unchanged amount of space for one delivery vehicle. The capacity can correspondingly be increased.

It is a further aspect of the invention that the space utilization is increased in comparison with an arrangement in which the receiving devices do not point into the interior of the circuit, since in this way there is scarcely any empty space in the interior of the circuit.

This leads to cost savings in the construction of the system and allows the system to be operated in an environmentally friendly manner, since, for example, space which cannot be utilized does not have to be unnecessarily heated or air-conditioned.

As has already been mentioned, the conveying device comprises the transport surface which can be moved in the transport direction, and is configured as a horizontal circuit with the at least two sections which lie opposite one another. In the present case, a horizontal circuit means that a perpendicular vector of the transport surface points upward in space over the entire circuit of the conveying device, and does not point downward in space for half of the circuit as in the case of a vertical circuit. The circuit can fundamentally have any desired self-contained shape, for example oval or circular or a figure of 8. It is preferably provided, however, that the sections of the circuit which lie opposite one another run parallel to one another. This simplifies at least one receiving device of the first group being arranged in the interior of the circuit laterally directly next to a receiving device of the second group. In addition, the conveying device is preferably configured to convey the piece goods, which are arranged and/or can be arranged on the transport surface, into the receiving device. For example, the conveying device can be configured to move the piece goods transversely with respect to the transport direction. For this purpose, the conveying device preferably has an ejecting device and/or a discharging device. The ejecting device and/or discharging device can be assigned in a stationary manner to the receiving device or, as an alternative, can circulate with the conveying device as in the case of a cross belt sorter. The conveying device is preferably configured to enable a positionally correct transition of the piece goods from the transport surface into the receiving device.

In the present case, piece goods mean usually non-standardized transport goods. The piece goods are preferably machinable. The piece goods are, for example, a packaged item, a package, small parcel and/or a (large) letter. The piece goods preferably have side dimensions of ≥100 mm×150 mm×10 mm, and/or a weight of ≥100 g. Further preferably, the piece goods have side dimensions of ≤600 mm×600 mm×1200 mm, and/or a weight of ≤31.5 kg. Other dimensions and/or weights of the piece goods are likewise possible, however.

It is provided in accordance with one preferred development of the invention that an end of the receiving device remote from the conveying device lies at a lower level than an end of the receiving device close to the conveying device. In addition, it is preferably provided in this context that the circuit of the conveying device does not run at ground level, but rather is elevated. Since, furthermore, at least one receiving device of the first group is arranged in the interior of the circuit laterally directly next to a receiving device of the second group, the receiving devices which are arranged next to one another preferably have a cross-shaped arrangement in the form of an X, as viewed from the side. This arrangement makes particularly satisfactory space utilization in the removal region possible. The efficiency when removing the piece goods in the removal regions can be increased in this way.

It is provided in accordance with a further preferred development of the invention that the multiplicity of receiving devices are arranged in such a way that receiving devices of the first group alternate with receiving devices of the second group in the interior of the circuit. In other words, a repeating crossed arrangement of the receiving devices of the first and second group is preferably provided in the interior of the circuit. Therefore, every second receiving device in the interior of the circuit preferably points to one side, and the remaining receiving devices point to the opposite side. The removal regions are distributed regularly in this way, which contributes to homogeneous space utilization and allows the removal of the piece goods in the removal regions to be of more efficient design, with the result that the sorting capacity is increased. In addition, the moving of the piece goods into the delivery vehicles is greatly facilitated as a result.

In addition, it is provided in accordance with a further preferred development of the invention in this context that the receiving devices are configured in pairs. The receiving devices are preferably configured as roller tracks and/or chutes and, in particular, as roller track pairs and/or chute pairs. A configuration in pairs preferably means that the receiving device comprises two tracks which point in the same direction for receiving the piece goods from the conveying device and for forwarding the piece goods to the removal region. A crossed arrangement in pairs of chutes and/or roller tracks is produced in this way in the interior of the circuit. In addition, the receiving device preferably has a movable and/or pivotable driven roller track at the end of the receiving device close to the conveying device and/or, following this in the direction of the end of the receiving device remote from the conveying device, a non-movable and/or non-pivotable driven roller track. In addition, it is preferably provided in this context that precisely one receiving device (that is to say, preferably a roller track pairs and/or chute pair) feeds in each case one ejecting device and/or dispensing device of the conveying device. It can further preferably be provided that the receiving devices are configured in pairs for feeding to removal regions. Therefore, the removal regions are preferably also as a rule arranged in pairs, which permits particularly favorable space utilization at the removal regions and leads to particularly efficient working procedures.

It is provided in accordance with a further preferred development of the invention that the system comprises a removal region open surface on the removal regions for receiving the piece goods from the receiving devices, the removal region open surface being arranged at the end of each respective receiving device, beneath the conveying device and/or beneath the laterally adjacent receiving device. The removal region open surface of each receiving device is particularly preferably arranged below the conveying device and below the laterally adjacent receiving device. The crossed arrangement of the receiving devices which are preferably configured as roller track pairs and/or chute pairs leads to an immense gain of space in the removal regions, with the result that the removal region open surface can be provided there. In conjunction with the configuration in pairs of the receiving device, the removal region open surface additionally preferably provides space for two removal regions. The removal region open surface enables different removals of the piece goods from the removal regions into the delivery vehicles and/or into containers such as trolleys and/or roller containers, without it being necessary for the arrangement of the receiving devices with respect to one another to be changed for this purpose.

In conjunction with the removal of the piece goods, it is provided in accordance with a further preferred development of the invention that the system comprises a plurality of containers, the containers being arranged on the removal region open surface, and/or the system comprises a pull-out table, the pull-out table adjoining the receiving device and being arranged on the removal region open surface. The pull-out table preferably comprises non-driven rollers, and can be connected to the end of the receiving device remote from the conveying device, or can be capable of being connected to the end of the receiving device remote from the conveying device. The containers are further preferably roller containers and/or trolleys which are used for loading the piece goods into delivery vehicles. The configuration of the respective removal region with containers and/or pull-out tables can particularly preferably be adapted, depending on whether combination district piece goods or standard district piece goods are being processed in the removal region. In this context, it is provided in accordance with a further preferred development of the invention that a configuration of containers and/or pull-out tables is identical on removal region open surfaces which lie next to one another, and/or a configuration of containers and/or pull-out tables is different on removal region open surfaces which lie opposite one another. Removal regions, in which combination district piece goods are processed, preferably have merely containers and no pulled-out pull-out tables and/or no pull-out tables.

Removal regions, in which standard district piece goods are processed, further preferably have containers and pull-out tables, particularly preferably pulled-out pool-out tables.

The configuration of containers and/or pull-out tables preferably means the number and arrangement of the containers and/all the pull-out tables and/or the status of the pull-out table (that is to say, pulled-out or not) on the removal region open surface.

In accordance with a further preferred development of the invention, the system comprises a building envelope for enclosing the conveying device and/or receiving devices, the building envelope comprising a multiplicity of doors and/or loading bays, and at least one, preferably two doors and/or loading bays being accessible per removal region open surface. The building envelope serves to protect the system and preferably encloses the conveying device and the receiving device. The removal region open surfaces are further preferably also enclosed by the building envelope. In order to enable the loading of the delivery vehicles, the building envelope further preferably has doors and/or loading ramps. The doors and/or loading ramps are preferably arranged on two opposite sides of the building envelope and are particularly preferably distributed homogeneously over the two opposite sides of the building envelope. The repeating crossed arrangement of the receiving devices particularly preferably leads to the removal regions being arranged homogeneously on the two inner sides of the building envelope. Therefore, the two outer sides of the building envelopes can preferably also be used as stopping and/or loading regions for delivery vehicles.

In this context, it is additionally provided in accordance with a further preferred development of the invention that the circuit of the conveying device extends substantially rectangularly along an inner side of the building envelope. Substantially rectangular means, in particular, that the corners of the rectangle are rounded. The two sections which lie opposite one another preferably extend in the longitudinal side of the substantially rectangular circuit. Particularly efficient space utilization can take place in this way, since the receiving devices which are preferably configured as roller track pairs and/or chute pairs point inward into the circuit, are preferably arranged so as to be crossed repeatedly, and the removal regions are preferably arranged regularly on the longitudinal side of the building envelope in such a way that the removal region open surface is arranged at the end of each receiving device, below the opposite section of the conveying device, and below the adjacent receiving device.

It is additionally provided in accordance with a further preferred development of the invention that the system comprises a feed device, in particular a telescopic belt conveyor, for feeding the piece goods onto the conveying device. There are particularly preferably a plurality of feed devices and/or the feed devices are preferably configured to be capable of being coupled to a swap body and/or a transport vehicle in order to unload the swap body and/or the transport vehicle. In this manner, the conveying device can be loaded in an efficient way with the piece goods for sorting and/or transferring.

It is further preferably provided that the system comprises a scanner arranged on the conveying device for scanning the piece goods. The piece goods and/or a code of the piece goods can be detected in this way, in order to sort them, for example, into the corresponding removal region in accordance with the delivery district. In the present case, delivery district means a specific sorting criterion of the piece goods. The delivery district is preferably a part of a populated area, to which the piece goods are to be delivered and which is preferably served by a delivery agent. During the sorting in accordance with the stored address list, the delivery district is preferably extrapolated on the basis of the code which is detected from the piece goods by means of the scanner.

In this context, it is provided in accordance with one preferred development of the invention, furthermore, that the system comprises a controller, the controller being configured in such a way that the system moves combination district piece goods (that is to say, piece goods of one category) by way of receiving devices of the first group to the removal regions, and that the system moves standard district piece goods (that is to say, piece goods of the other category) by way of receiving devices of the second group to the removal regions. In other words, it is preferably provided that programming of the controller achieves a situation where combination district piece goods slide only to the removal regions of the combination side and standard district piece goods slide only to the removal regions of the standard side, as a result of which a spatial separation of the combination district piece goods and standard district piece goods is ensured. In addition, the doors on both sides of the building envelope are preferably used in this way, with the result that twice as many delivery vehicles can be loaded at the same time from the removal regions as if only one side of the building envelope were used.

As has already been mentioned, furthermore, the object of the invention is achieved by the method for transferring and/or sorting piece goods into removal regions preferably by way of the above-described system, with the step of:

sorting of the piece goods in such a way that combination district piece goods are moved by way of receiving devices of the first group to the respective removal C) regions, and that standard district piece goods are moved by way of receiving devices of the second group to the respective removal regions.

The spatial separation of the removal regions for combination district piece goods and for standard district piece goods which is enabled by way of the above-described arrangement of the receiving devices, and the gain of space at the removal regions, lead to an increased flexibility of the system. Changing quantities of piece goods of a different category (combination district piece goods and/or standard district piece goods) can therefore be reacted to flexibly by means of the method. The removal region open surface is preferably used to store empty containers and, in particular, to store empty containers below the laterally adjacent receiving devices.

Furthermore, the increased availability of space at the removal regions enables different removals of the piece goods at removal regions, without it being necessary for the arrangement of the receiving devices with respect to one another to be changed for this purpose. Therefore, the method is suitable not only for transferring and/or sorting piece goods into the removal regions, but rather also enables the transferring and/or sorting of the piece goods from the removal regions.

In this context, it is provided in accordance with one preferred development of the invention that the method comprises the following steps:

sorting of the piece goods in such a way that combination district piece goods of a plurality of delivery districts are moved into one removal region, removing of the combination district piece goods in the removal regions into a plurality of containers, the number of containers corresponding at least to the number of delivery districts, and the combination district piece goods being sorted into the containers in a manner which is separated according to delivery district, loading of a delivery vehicle from a full container with consideration of the delivery district of the container.

In other words, it is preferably provided during the removal of the piece goods in the removal regions that the combination district piece goods are sorted in such a way that piece goods of a plurality of delivery districts are moved into a common removal region, in order to be sorted further there. Piece goods of more than two and particularly preferably four different delivery districts are preferably moved into one removal region. The further sorting of the piece goods then preferably takes place by means of the containers present on the removal region open surface in such a way that, separated according to delivery district, the combination district piece goods are preferably sorted manually by workers into the containers. The size of the removal region open surface allows, in particular, it to be possible for four combination delivery districts to be processed in one removal region. This sorting process is preferably followed by a downstream loading operation of a delivery vehicle which can particularly preferably be arranged or is arranged in front of the door and/or the loading bay which is accessible from the removal region open surface. Full containers can further preferably be buffer-stored in front of the door. For example, 80 combination districts can be served in this way in the case of 20 removal regions.

As an alternative to this 4-into-1 removal, in the case of which the combination district piece goods of four combination delivery districts are sorted by means of at least four containers, a removal in accordance with the 4-into-2 principle with negative ejecting can also take place. For example, 80 combination districts can also be served in this way in the case of 20 removal regions. In this regard, it is provided in accordance with a further preferred development of the invention that the method comprises the following steps:

sorting of the piece goods in such a way that combination district piece goods of a plurality of delivery districts are moved into one removal region, removing of the combination district piece goods in the removal regions into a plurality of containers, the number of containers corresponding at least to half the number of delivery districts, and combination district piece goods of two delivery districts being sorted in each case into one container, loading of a first delivery vehicle from a full container with combination district piece goods of precisely one delivery district, and loading of a further delivery vehicle with the combination district piece goods of the further delivery district which remain in the container.

As described above, the combination district piece goods are preferably sorted in such a way that piece goods of a plurality of delivery districts are moved into a common removal region, in order to be sorted further there. Piece goods from more than two and particularly preferably four different delivery districts are further preferably moved into one removal region. The further sorting of the piece goods then likewise preferably takes place by means of the containers which are present on the removal region open surface, by the combination district piece goods preferably being sorted manually by workers into the containers. It is particularly preferably provided here that one common container is used for two delivery districts. During the subsequent loading of the delivery vehicle from a full container which then correspondingly contains combination district piece goods from two different delivery districts, a negative ejection then takes place in such a way that a second delivery vehicle can be loaded with the combination district piece goods which remain in the container.

With regard to the higher piece good quantities which are to be expected in the standard s district, it is preferably provided in accordance with a further development of the invention that the method comprises the following steps:

sorting of the piece goods in such a way that standard district piece goods of two delivery districts are moved into one removal region, removing the standard district piece goods in the removal regions by way of loading of a first delivery vehicle, the delivery vehicle being loaded with standard district piece goods of precisely one delivery district, and standard district piece goods of the further delivery district being buffer-stored in each case in a container, loading of a further delivery vehicle with the standard district piece goods of the further delivery district which are buffer-stored in the container.

In other words, in the case of the standard district piece goods, the delivery vehicles are preferably loaded directly with negative ejection, the standard district piece goods which are ejected during loading being buffer-stored in the containers, in order subsequently to be loaded from the containers into a further delivery vehicle. For example, 40 standard districts can be served in this way in the case of 20 removal regions. In addition, the greater available space allows a trailer to be coupled to the first and/or to the second delivery vehicle, with the result that up to twice as many standard district piece goods can be delivered during one vehicle journey than without a trailer.

It is additionally provided in accordance with a further preferred development of the invention that the method comprises the step:

feeding of the piece goods onto the conveying device by means of a feed device, the piece goods being fed loosely.

The piece goods are particularly preferably exclusively fed loosely. This makes it possible that a feed of piece goods in roller containers can be dispensed with in the case of the system and in the case of the method, with the result that further surfaces which have up to now been required for these roller containers become free.

BRIEF DESCRIPTION OF THE DRAWINGS

In the following text, the invention will be explained in greater detail on the basis of preferred exemplary embodiments with reference to the appended drawings, in which.

DETAILED DESCRIPTION OF THE EXEMPLARY EMBODIMENTS

Figure 1:
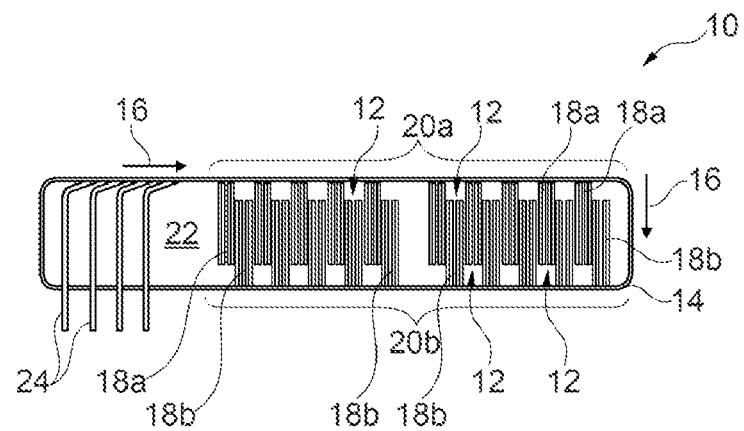
FIG. 1 shows a diagrammatic view of a system for transferring and/or sorting piece goods into removal regions, in accordance with one preferred exemplary embodiment of the invention.

FIG. 1 shows a diagrammatic view of a system 10 for transferring and/or sorting piece goods (the piece goods themselves are not shown) into removal regions 12, in accordance with one preferred exemplary embodiment of the invention. The system 10 comprises a conveying device 14 with a transport surface, movable in a transport direction 16, for piece goods, and a multiplicity of receiving devices 18 for moving the piece goods from the transport surface of the conveying device 14 into the respective removal regions 12.

The conveying device 14 is configured as a horizontal circuit, and has at least two sections 20a, 20b which lie opposite one another, a first group of receiving devices 18a pointing from the first of the two sections 20a, 20b into an interior 22 of the circuit, a second group of receiving devices 18b pointing from the second of the two sections 20a, 20b into the interior 22 of the circuit, and at least one receiving device of the first group 18a being arranged in the interior 22 of the circuit laterally directly next to a receiving device of the second group 18b. As can be seen in FIG. 1, the multiplicity of receiving devices 18 are additionally arranged in such a way that receiving devices of the first group 18a alternate with receiving devices of the second group 18b in the interior 22 of the circuit. In addition, the system 10 has a feed device 24 (in the present case, four telescopic belt conveyors 24) for feeding the piece goods onto the conveying device 14.

Figure 2:
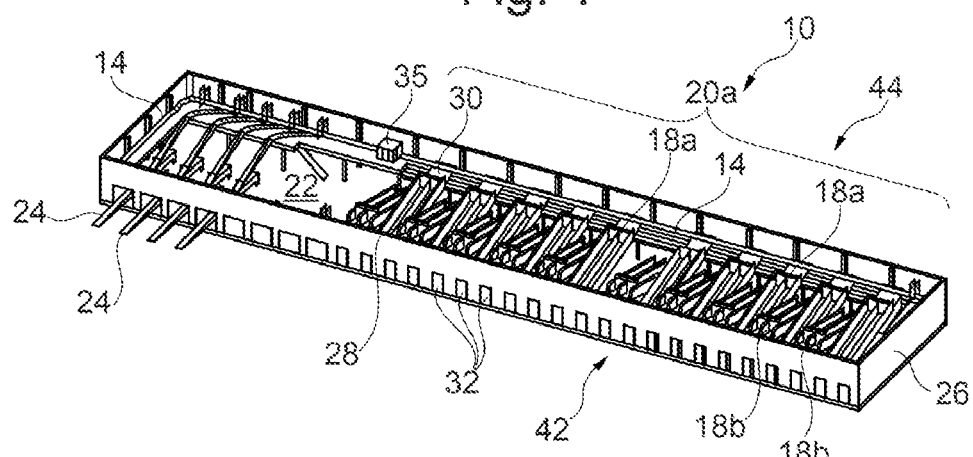
FIG. 2 shows a perspective illustration of a system for transferring and/or sorting piece goods into removal regions, in accordance with a further preferred exemplary embodiment of the invention.

FIG. 2 shows a perspective illustration of a further exemplary embodiment of a system 10 for transferring and/or sorting piece goods into removal regions 12 in accordance with a further preferred exemplary embodiment of the invention. In an analogous manner with respect to the exemplary embodiment in FIG. 1, the system 10 comprises a conveying device 14 and a multiplicity of receiving devices 18. The conveying device 14 is likewise configured as a horizontal circuit, and has at least two portions 20a, 20b which lie opposite one another, the second portion 20b not being visible in FIG. 2 on account of the perspective illustration. In this exemplary embodiment, the system 10 additionally comprises a building envelope 26 for enclosing the conveying device 14 and receiving devices 18. The circuit of the conveying device 14 extends along an inner side of the building envelope 26, and has a substantially rectangular shape with rounded corners. In addition, the circuit of the conveying device 14 does not extend at ground level, but rather in an elevated manner. In the present exemplary embodiment, the building envelope 26 is 21 m wide and 103.4 in long.

The sections 20a, 20b which lie opposite one another run parallel to one another in the present case and correspond to the two opposite longitudinal sides of the rectangle of the circuit. As can additionally be seen in FIG. 2, a first group of receiving devices 18a points from the first of the two sections 20a, 20b into the interior 22 of the circuit, and a second group of receiving devices 18b points from the second of the two sections 20a, 20b into the interior 22 of the circuit. In the present case, the receiving devices 18 are configured as chute pairs 18. As a result, an end 28 of the receiving device 18 remote from the conveying device 14 lies at a lower level than an end 30 of the receiving device 18 close to the conveying device. In addition, the chute pairs 18 are configured to serve two removal regions 12. In addition, a receiving device of the first group 18a is arranged in the interior 22 of the circuit laterally directly next to a receiving device of the second group 18b, the receiving devices of the first group 18a alternating with receiving devices of the second group 18b. Correspondingly, the removal regions 12 are arranged homogeneously in pairs on the inner side of the building envelope 26.

Figure 3:
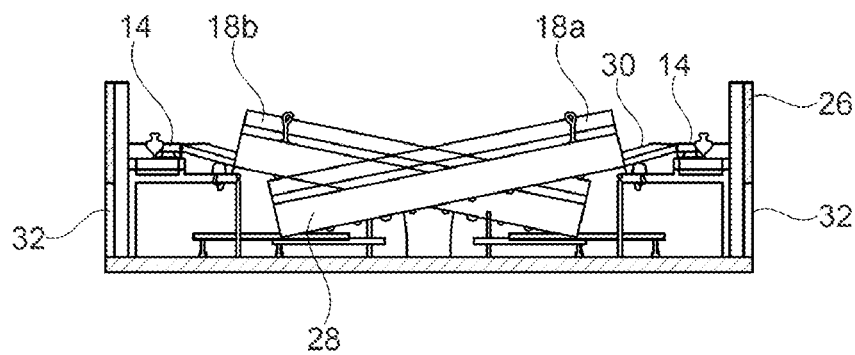
FIG. 3 shows a diagrammatic sectional view of the system from FIG. 2 with two receiving devices.

FIG. 3 shows a diagrammatic sectional view of the system from FIG. 2: it can be seen clearly here that the crossed arrangement of the receiving devices 18 leads to the shape of an X being produced as viewed from the side. As can additionally be seen in FIGS. 2 and 3, the building envelope 26 has a multiplicity of doors 32, the doors 32 being present on the two opposite longitudinal sides of the building envelope 26.

Figure 4:
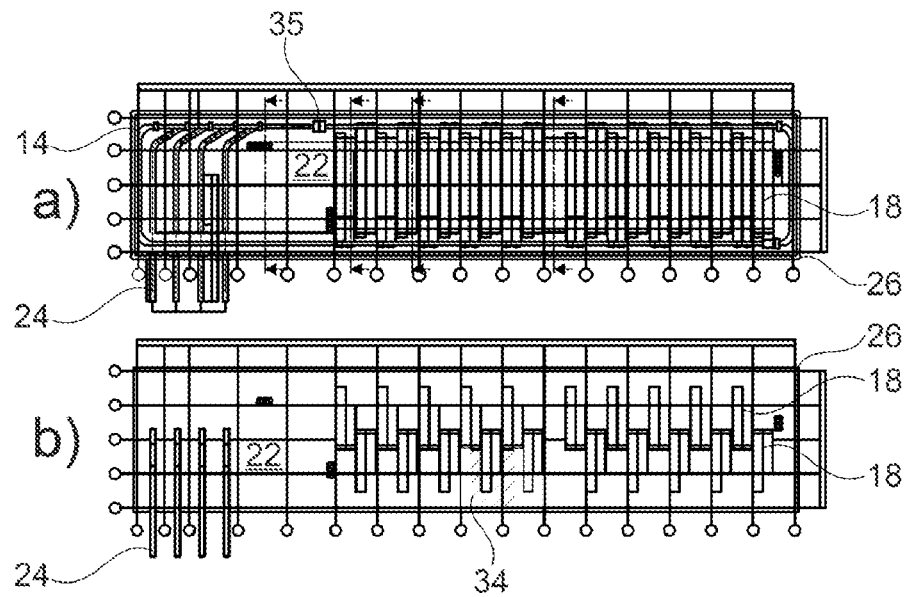
FIG. 4 shows a diagrammatic plan view and a diagrammatic sectional view in the case of a height of 2 m 10 cm of the system from FIG. 2.

In FIG. 4 which shows a diagrammatic plan view and a diagrammatic sectional view in the case of a height of 2 m 10 cm of the system from FIG. 2, it can additionally be seen that the crossed arrangement of the chute pairs 18 is accompanied by a large amount of clearance at the removal regions 12. As is show % n in FIG. 4b) (which, as a sectional view, correspondingly shows only objects which are smaller than or equal to 2 m 10 cm), the system 10 has removal region open surfaces 34 at the removal regions 12, the removal region open surface 34 being arranged at the end of each respective receiving device 18, below the conveying device 14 and below the laterally adjacent receiving device 18.

Figure 5:
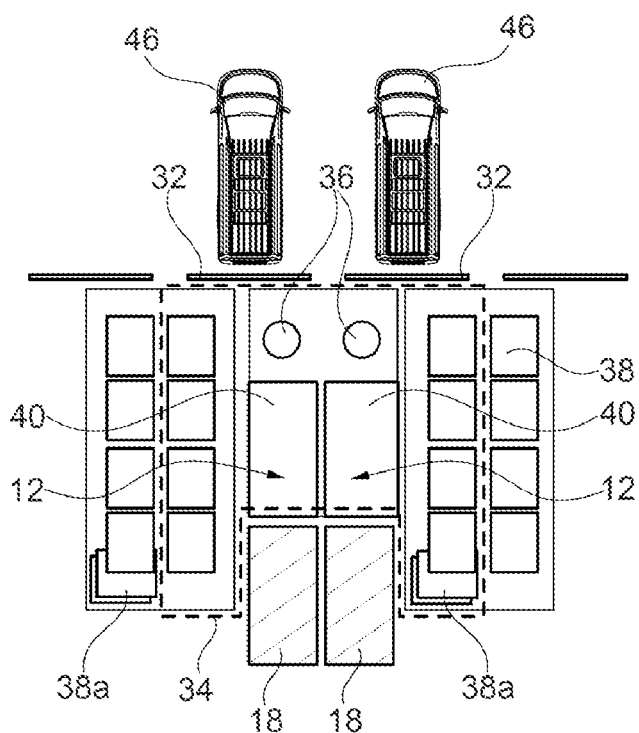
FIG. 5 shows a diagrammatic view of removal regions of a system for removing standard district piece goods, in accordance with one preferred exemplary embodiment of the invention.
Figure 6:
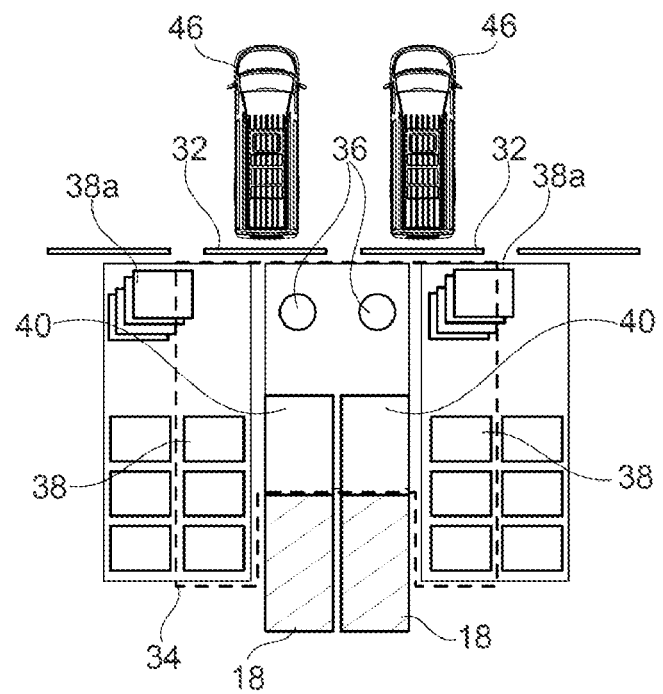
FIG. 6 shows a diagrammatic view of removal regions of a system for removing standard district piece goods as an alternative to FIG. 5, in accordance with one preferred exemplary embodiment of the invention.
Figure 7:
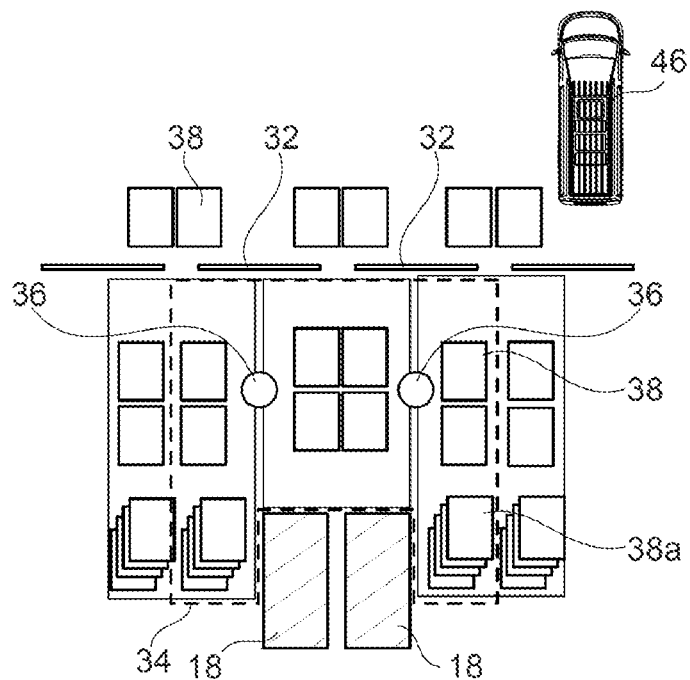
FIG. 7 shows a diagrammatic view of removal regions of a system for removing combination district piece goods, in accordance with one preferred exemplary embodiment of the invention.

In addition, it can also be seen in FIG. 4a) and in FIG. 2 that the system 10 comprises a scanner 35 which is arranged on the conveying device 14 for scanning the piece goods. FIGS. 5, 6 and 7 each show a diagrammatic view of removal regions 12 of a system 10 for removing piece goods, in accordance with preferred exemplary embodiments of the invention, and illustrate how the removal region open surface 34 can be utilized. Since the chute pairs 18 are configured to serve two removal regions 12, two removal regions 12 are accommodated on the removal region open surface 34, each removal region 12 being operated by a worker 36. A plurality of containers 38 (in the present case, roller containers) are arranged on the removal region open surface 34, and in each case one pull-out table 40 adjoining the chute 18 in the exemplary embodiments which are shown in FIGS. 5 and 6. In addition, the removal region open surface 34 provides space to store further containers 38a as reserve. At least two doors 32 of the building envelope 26 are accessible from the removal region open surface 34. In addition, the containers 38 and reserve containers 38a which are arranged on the removal region open surface, adjacent to the right and the left of the removal region open surface 34, of the adjacent removal region are also illustrated diagrammatically in FIGS. 5, 6 and 7.

With reference to FIGS. 2 and 5 to 7, a method for transferring and/or sorting piece goods into removal regions 12 by way of the system 10 will be explained in the following text. The method comprises the step:

sorting of the piece goods in such a way that combination district piece goods are moved by way of receiving devices of the first group 18a to the respective removal regions 12, and that standard district piece goods are moved by way of receiving devices of the second group 18b to the respective removal regions 12.

As can be seen in FIG. 2, the piece goods are separated spatially (depending on the category and/or delivery type of the piece goods), piece goods which are delivered in a combination district (what are known as combination district piece goods) being transported to the removal regions 12 on one side 42 of the building envelope 26, and piece goods which are delivered in a standard district (what are known as standard district piece goods) being transported to the removal regions 12 on the opposite side 44 of the building envelope 26. The building envelope 26 has a combination side 42, in which removal regions 12 are arranged which process combination district piece goods, and a standard side 44, in which removal regions 12 are arranged which process standard district piece goods.

The removal regions 12 of the combination side 42 are configured as shown in FIG. 7, the method additionally also comprising the following steps in relation to FIG. 7:

sorting of the piece goods in such a way that combination district piece goods of a plurality of delivery districts (four delivery districts in the present example shown in FIG. 7) are moved to a removal region 12, removing of the combination district piece goods at the removal regions 12 into a plurality of containers 38, the number of containers 38 corresponding at least to the number of delivery districts, and the combination district piece goods being sorted separately into the containers 38 in accordance with the delivery district, loading of a delivery vehicle 46 from a full container 38 with consideration of the delivery district of the container 38.

The sorting of the piece goods at the removal regions 12 of the combination side 42 takes place by means of the containers 38 which are present on the removal region open surface 34, in such a way that the combination district piece goods are sorted manually by the workers 36 into the containers 38 in a manner which is separated according to delivery district. This sorting process is followed by the downstream loading operation of the delivery vehicle 46 which is arranged in front of the door 32 accessible from the removal region open surface 34.

The removal regions 12 of the standard side 42 are configured as shown in FIG. 5 or 6, the method additionally also comprising the following steps in relation to FIG. 5 or 6:

sorting of the piece goods in such a way that standard district piece goods of two delivery districts are moved into one removal region 12, removing of the standard district piece goods in the removal regions 12 by way of loading of a first delivery vehicle 46, the delivery vehicle 46 being loaded with standard district piece goods of precisely one delivery district, and standard district piece goods of the further delivery district being buffer-stored in each case in a container 38, loading of a further delivery vehicle (not shown in FIGS. 5 and 6) with the standard district piece goods, buffer-stored in the container 38, of the further delivery district.

The sorting of the piece goods in the removal regions 12 of the standard side 44 takes place by the workers 36 directly loading the delivery vehicles 46 with standard district piece goods with negative ejection, the standard district piece goods which are ejected during loading being buffer-stored in the container 38. After the delivery vehicles 46 have been loaded and driven away, the standard district piece goods which are buffer-stored in the containers 38 can be loaded in a second wave into further delivery vehicles (not shown in FIGS. 5 and 6).

A The described exemplary embodiments are merely examples which can be modified and/or supplemented in a wide variety of ways within the context of the claims. Each feature which has been described for a defined exemplary embodiment can be utilized independently or in combination with other features in any desired other exemplary embodiment. Each feature which has been described for an exemplary embodiment of one defined category can also be used in a corresponding way in an exemplary embodiment of another category.

LIST OF DESIGNATIONS

System 10
Removal region 12
Conveying device 14
Transport direction 16
Receiving device, chute pair 18
Receiving device of the first group 18a
Receiving device of the second group 18b
First section 20a
Second section 20b
Interior of the circuit 22
Feed device, telescopic belt conveyor 24
Building envelope 26
End of the receiving device remote from the conveying device 28
End of the receiving device close to the conveying device 30
Door 32
Removal region open surface 34
Scanner 35
Employee 36
Container 38
Reserve container 38a
Pull-out table 40
Network side 42
Control side 44
Delivery vehicle 46

The invention claimed is:

1. A system for transferring and/or sorting piece goods into removal regions comprising:

a conveying device with a transport surface, movable in a transport direction, for piece goods, and a multiplicity of receiving devices for moving the piece goods from the transport surface of the conveying device into the respective removal region, the conveying device being configured as a horizontal circuit, and having at least two sections which lie opposite one another, a first group of receiving devices pointing from the first of the two sections into an interior of the circuit, a second group of receiving devices pointing from the second of the two sections into the interior of the circuit, and at least one receiving device of the first group being arranged in the interior of the circuit laterally directly next to a receiving device of the second group.

2. The system according to claim 1, wherein an end of the receiving device remote from the conveying device lying at a lower level than an end of the receiving device close to the conveying device.

3. The system according to claim 1, the multiplicity of receiving devices being arranged in such a way that receiving devices of the first group alternate with receiving devices of the second group in the interior of the circuit.

4. The system according to claim 1, the receiving devices being configured in pairs, and/or the receiving devices being configured as roller track pairs and/or chute pairs.

5. The system according to claim 1, comprising a removal region open surface on the removal regions for receiving the piece goods from the receiving devices, the removal region open surface being arranged at the end of each respective receiving device, beneath the conveying device and/or beneath the laterally adjacent receiving device.

6. The system according to claim 1, comprising a plurality of containers, the containers being arranged on a removal region open surface, and/or comprising a pull-out table, the pull-out table adjoining the receiving device and being arranged on the removal region open surface.

7. The system according to claim 6, a configuration of containers and/or pull-out tables being identical on removal region open surfaces which lie next to one another, and/or a configuration of containers and/or pull-out tables being different on removal region open surfaces which lie opposite one another.

8. The system according to claim 1, comprising a building envelope for enclosing the conveying device and/or receiving devices, the building envelope comprising a multiplicity of doors and/or loading bays, and at least one door and/or loading bay being accessible per removal region open surface.

9. The system according to claim 1, the circuit of the conveying device extending rectangularly-along an inner side of a building envelope.

10. The system according to claim 1, comprising at least one feed device for feeding the piece goods onto the conveying device.

11. The system according to claim 1, comprising a controller, the controller being configured in such a way that the system moves combination district piece goods by way of receiving devices of the first group to the removal regions, and that the system moves standard district piece goods by way of receiving devices of the second group to the removal regions.

12. A method for transferring and/or sorting piece goods into removal regions by way of a system comprising:
   a conveying device with a transport surface, movable in a transport direction, for piece goods, and
   a multiplicity of receiving devices for moving the piece goods from the transport surface of the conveying device into the respective removal region,
   the conveying device being configured as a horizontal circuit, and having at least two sections which lie opposite one another,
   a first group of receiving devices pointing from the first of the two sections into an interior of the circuit,
   a second group of receiving devices pointing from the second of the two sections into the interior of the circuit, and
   at least one receiving device of the first group being arranged in the interior of the circuit laterally directly next to a receiving device of the second group,
   with the step:
      sorting of the piece goods in such a way that combination district piece goods are moved by way of receiving devices of the first group to the respective removal regions, and that standard district piece goods are moved by way of receiving devices of the second group to the respective removal regions.

13. The method according to claim 12, comprising the steps:
   sorting of the piece goods in such a way that combination district piece goods of a plurality of delivery districts are moved into one removal region,
   removing of the combination district piece goods in the removal regions into a plurality of containers, the number of containers corresponding at least to the number of delivery districts, and the combination district piece goods being sorted into the containers in a manner which is separated according to delivery district,
   loading of a delivery vehicle from a full container with consideration of the delivery district of the container.

14. The method according to claim 12, comprising the steps:
   sorting of the piece goods in such a way that combination district piece goods of a plurality of delivery districts are moved into one removal region,
   removing of the combination district piece goods in the removal regions into a plurality of containers, the number of containers corresponding at least to half the number of delivery districts, and combination district piece goods of two delivery districts being sorted in each case into one container,
   loading of a first delivery vehicle from a full container with combination district piece goods are precisely one delivery district, and
   loading of a further delivery vehicle with the combination district piece goods of the further delivery district which remain in the container.

15. The method according to claim 12, comprising the steps:
   sorting of the piece goods in such a way that standard district piece goods of two delivery districts are moved into one removal region,
   removing the standard district piece goods in the removal regions by way of:
   loading of a first delivery vehicle, the delivery vehicle being loaded with standard district piece goods of precisely one delivery district, and standard district piece goods of the further delivery district being buffer-stored in each case in a container,
   loading of a further delivery vehicle with the standard district piece goods of the further delivery district which are buffer-stored in the container.

16. The method according to claim 12, comprising the step of:
   feeding of the piece goods onto the conveying device by means of a feed device, the piece goods being fed loosely.

* * * * *